April 7, 1936.    E. L. BOWLES ET AL    2,036,252
ELECTRODYNAMIC APPARATUS
Filed Oct. 31, 1932    6 Sheets-Sheet 1

Inventors.
Edward L. Bowles
Guy H. B. Smith Jr.
by Heard Smith & Tennant.
Attys.

April 7, 1936.  E. L. BOWLES ET AL  2,036,252
ELECTRODYNAMIC APPARATUS
Filed Oct. 31, 1932  6 Sheets-Sheet 2

Inventors.
Edward L. Bowles
Guy H. B. Smith Jr.
by Heard Smith & Tennant.
Attys.

April 7, 1936.  E. L. BOWLES ET AL  2,036,252
ELECTRODYNAMIC APPARATUS
Filed Oct. 31, 1932   6 Sheets-Sheet 3

Inventors.
Edward L. Bowles
Guy H. B. Smith Jr.
by Heard Smith & Tennant.
Attys.

April 7, 1936.  E. L. BOWLES ET AL  2,036,252
ELECTRODYNAMIC APPARATUS
Filed Oct. 31, 1932   6 Sheets-Sheet 5

Inventors.
Edward L. Bowles
Guy H.B. Smith Jr.
by Heard Smith & Tennant.
Attys

April 7, 1936. E. L. BOWLES ET AL 2,036,252
ELECTRODYNAMIC APPARATUS
Filed Oct. 31, 1932  6 Sheets-Sheet 6

Inventors.
Edward L. Bowles
Guy H. B. Smith Jr.
by Heard Smith & Tennant.
Attys.

Patented Apr. 7, 1936

2,036,252

UNITED STATES PATENT OFFICE 2,036,252

ELECTRO-DYNAMIC APPARATUS

Edward L. Bowles, Wellesley Farms, and Guy Howard Berard Smith, Jr., Boston, Mass., assignors to Frank B. Hopewell, Newton, Mass., trustee Application October 31, 1932, Serial No. 640,481

32 Claims. (Cl. 139—142)

In an application filed by us, Serial No. 530,716, filed April 16, 1931, there has been set forth and claimed an apparatus and a method for the electro-dynamic propulsion of a body in a rectilinear path or along and between the limits of a defined path or into space and the principles therein involved were particularly set forth in connection with the operation of a filling carrier in a loom. The invention therein set forth was broadly directed to an apparatus and method in which an electro-magnetic field created by a polyphase electric current with the exciting coils placed upon a core in a manner to create a field in which the point of maximum flux density traveled rectilinearly or between the limits of a defined path and in which this field, acting upon an electric conductor generated or induced a current therein which in turn produced a flux co-acting with the flux of the traveling field resulted in the movement of the conductor with the traveling field and secured the rapid acceleration of the conductor to attain a speed approximating that of the field itself.

The present invention is directed to generally similar objects to that set forth in the aforesaid application in which, however, the electro-magnetic field set up in one element is created by direct electric current, or, under some circumstances, a single phase current, the flux of which co-acts with a flux generated in the other element by electric current conducted thereto.

The present invention further involves the application of this broad principle to the operation of a loom, and more particularly to the operation of the filling carrier or carriers.

The present invention further has for its object to provide novel features of construction and methods of operation primarily for use when the conductive method of electro-dynamic operation is involved, but in some respects for use when the inductive method is involved.

These and other objects and features of the invention, both in their generic aspect and more specifically as applied to a loom, will appear more fully from the accompanying description and drawings and as set forth in the claims.

As one of the many specific embodiments of the present invention, it is herein shown embodied in a loom for performing certain functions therein. More particularly the invention is shown as embodied in an apparatus for carrying the filling through the shed during the weaving operation.

In a loom, the filling must be passed through the shed of warps in order to form therewith the cloth being woven. This filling may run continuously back and forth, it may be inserted in single or double picks or otherwise, the supply of filling may be carried bodily through the shed, or it may be taken from a supply located outside of the shed, but in all cases a translatory motion in a defined limited path, preferably rectilinear, and rapidly repeated is necessary. That type of loom here selected for illustrating the invention utilizes as the filling carrier a shuttle carrying the supply of filling. The utilization of the invention in a loom as applied to this feature of the weaving operation enables the required velocity to be given to the shuttle or other filling carrier with an entire absence of shock and jar, noise and vibration, and also enables the movement of the shuttle or filling carrier to be checked in the same manner.

In the drawings, a simple type of loom is shown and since, in the disclosure of one preferred form of the present invention as embodied in such a loom, it is only necessary to consider an apparatus for and method of propelling and checking the shuttle or filling carrier, it is unnecessary either to illustrate or describe other features of the loom construction and operation as such features in themselves form no part of the present invention and may be of any suitable type.

In the construction illustrated in Figs. 1 to 5, inclusive, and 14, the translator element carries the coils to which the current is conducted and moves through the stationary flux field of the stator element. Such stator and translator elements are located at each end of the lay of the loom and the translator in each case acts to propel a separate filling carrier which in this case is shown as a shuttle carrying a weft supply wound on a bobbin.

The stator and translator elements are here shown as of telescoping cylindrical construction which presents a highly efficient arrangement for securing the maximum coaction of the fluxes in effecting the movement of the translator. This telescoping cylindrical construction is not only efficient in utilizing the conductive method of operation herein disclosed, but is also efficient in utilizing the inductive method disclosed in our aforesaid application and in its broad features is therefore independent of the particular method employed in effecting relative longitudinal movement of the stator and translator.

Figure 1:
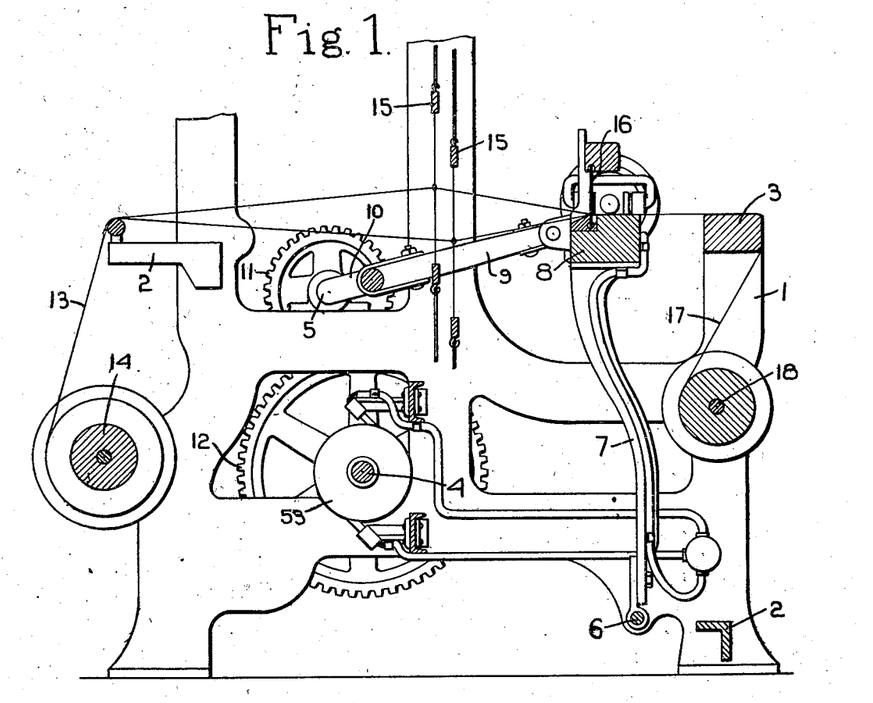
Fig. 1 is a cross sectional view of a loom showing some of the main elements thereof and having a preferred form of the invention embodied therein.

The loom illustrated comprises the usual side frames such as 1 connected by the usual transverse girts 2, breast beam 3, main shaft 4, crank shaft 5, lay rocker shaft 6 and other parts. The lay swords 7 mounted on the lay rocker shaft 6 support the usual lay 8 which is given its characteristic backward and forward movement by the pitmans 9 connecting it to the crank arms 10 on the crank shaft 5. In this case the crank shaft 5 is shown as geared by the gears 11 and 12 to the main shaft 4. The warps 13 extend from the warp beam 14 journalled at the rear of the loom through the harness frames 15 and through the reed 16 and the woven cloth 17 is wound up on the cloth roll 18 journalled at the front of the loom, all in the usual manner.

Figure 2:
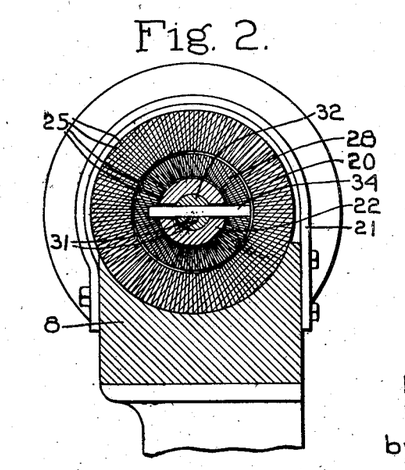
Fig. 2 is a view on a larger scale in vertical cross section through the lay.
Figures 3, 4, 5:
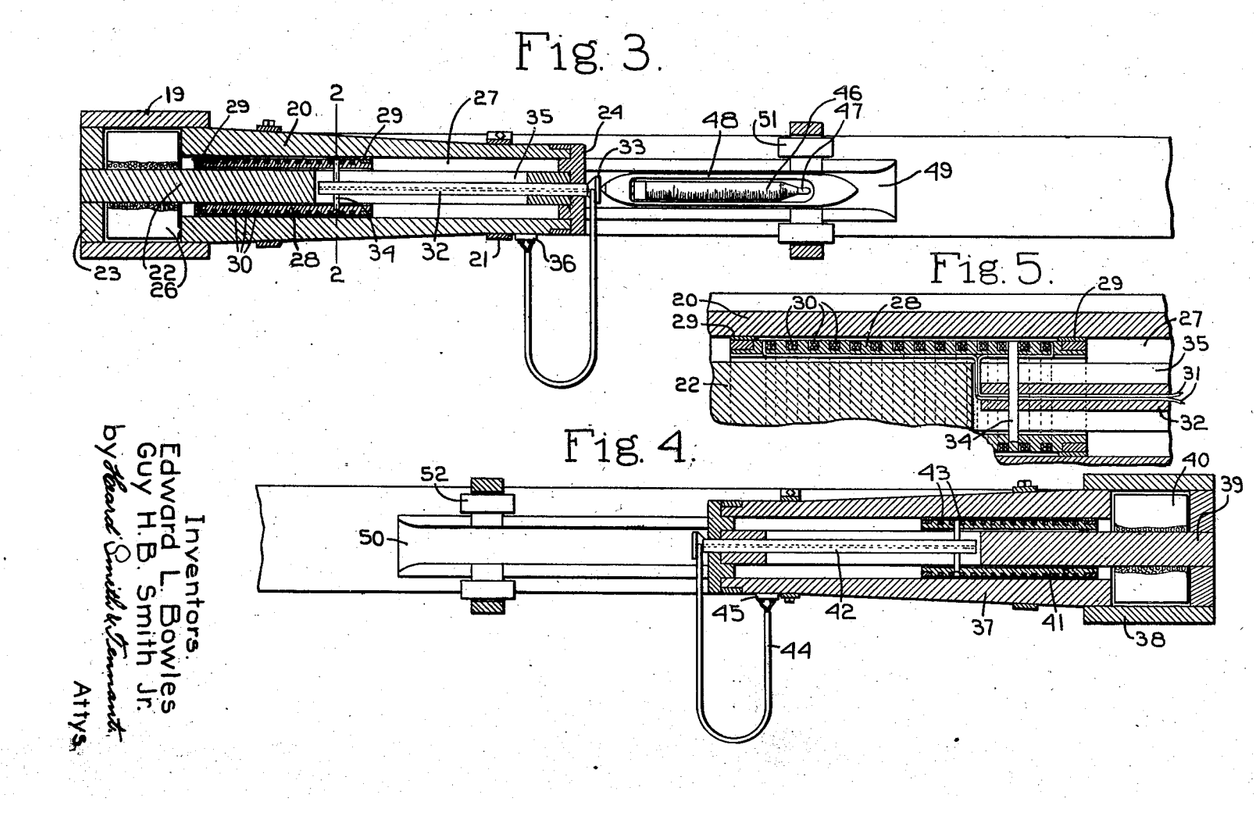
Fig. 3 is a plan view partially in horizontal cross section showing the construction at the left-hand end of the lay.
Fig. 4 is a similar view showing the construction at the right-hand end of the lay.
Fig. 5 is a detail on a larger scale partially in horizontal cross section and partially broken away of the construction shown in Fig. 3.

The construction, to which the invention more particularly relates, for controlling the movement of the filling carrier or shuttle is preferably, as shown, the same at both ends of the lay and it will be sufficient, therefore, to describe in detail the construction at the left-hand end shown in detail in Figs. 2, 3, and 5.

The stator comprises a core of rectilinear form in two sections, namely, an outer hollow cylindrical section and an inner concentric cylindrical section extending throughout the length thereof and presenting between these sections an annular air gap in which the translator moves. These core sections are made of suitable magnetic material of low magnetic resistance and so shaped as to produce the required flux field over the required range of space. The outer cylindrical core section is shown as made in two parts 19 and 20 secured together and suitably secured to the lay with, as shown, the part 20 fitting in a recess on the top of the lay and clamped thereto by metal bands 21. The inner core section 22 is supported concentrically of the outer core section 19, 20 at the outer end by a member 23 of similar magnetic material and at the inner end by a cap 24 of non-magnetic material fitting over the end of the section 20. The core section 20 is preferably formed of soft iron or steel in radial laminations, as shown at 25 in Fig. 2. The core of the stator 5 is energized to set up the flux field by a suitable coil or coils 26 of insulated wire conveniently located at the outer end of the core concentric with and between the inner and outer sections. To this coil is supplied preferably a direct electric current, although under some circumstances a single phase alternating current may be supplied. The flux field thus set up is of constant mean intensity and when the direct current is used, as is preferable, is of substantially constant intensity and is a field stationary with respect to the stator. The flux paths traverse the outer cylindrical core section longitudinally thereof, cross the annular air gap 27, traverse the inner core section and complete their circuit through the magnetic material 23. The part 20 of the outer core section is desirably tapered toward its outer end, as illustrated, in a form such that the cross section of the outer core at each point throughout the length of the air gap is such as to maintain a constant flux density in the outer core section as the flux decreases toward the outer end.

The translator is shown as a cylinder 28 fitted to slide within and longitudinally of the air gap 27 between the core sections of the stator. It is preferably provided at suitable points with anti-friction rings 29 having an easy sliding fit on the inner cylindrical surface of the core section 20. The translator 28 may be made of similar magnetic material preferably composed of laminations 25 and in this case acts to reduce the effective air gap between the core sections and therefore the electro-magnetic force required to maintain the required flux field. But where the construction is such that any deviation from a centrally balanced position between the translator and the stator would produce unbalanced forces of attraction between the two, the translator may, to obviate this difficulty, be formed of non-magnetic material. The translator is here shown laminated similarly to the core sections. The translator is provided with conductors 30 of insulated wire formed either into a continuous helix or into connected rings embedded in a groove or grooves formed in its exterior and the current is conducted thereto by the leads 31. In the construction illustrated, the translator moves within the stator and transmits its operation to the independent shuttle by means of an extension or picker rod 32. This rod 32 is shown as provided with a head 33 for engagement with the shuttle tip while its shank extends through and is guided in a bearing in the cap 24 and inner core section 22. At its outer end the rod 32 is provided with a transverse pin 34 connecting it to the translator and the inner core section 22 is slotted transversely at 35 throughout the required portion of its length to provide for the movement of this pin. The leads 31 by which current is conducted to the conductors 30 are conveniently taken out through a central bore in the rod 32 and extend in flexible form from the head 33 to a fixed point 36 on the lay.

As already pointed out, a similar construction, shown in Fig. 4, is provided at the right-hand side of the lay including the stator with its outer hollow cylindrical core 37, 38, its inner cylindrical core 39 and exciting coil 40, the translator 41 and picker rod 42 with its conductors 43 energized through leads 44 extending out through the picker rod and connected to the lay at 45.

In the illustrated case the filling supply 46 is carried by a bobbin 47 in a shuttle 48 and this shuttle is propelled back and forth across the lay by the picker rods 32 and 42 actuated by the translators.

In accordance with the principle of this invention, it will be seen that with a given construction of the elements such as described, the direction of movement of the translator is determined by the direction of current flow in the coils of the stator and translator and consequently the direction of the flux of the magnetic field of the stator and the direction of the current flowing in the conductors of the translator. It follows, therefore, that by controlling the direction of flow of the current supplied to either or both of these elements, the direction of movement of the translator with respect to the stator is determined. So also the force exerted by the translator is determined by the power of the electric currents supplied to these two elements. The acceleration and deceleration of the translator in either direction is therefore under complete control. In the operation of the loom, the respective translators 28 and 41 are accelerated at the proper times toward the center of the loom to cause their respective picker rods 32 and 42 to engage and propel the shuttle in the required direction across the loom. In each case the translator and picker must be stopped at the end of the picking movement and returned to its original or picking position before the time for the next pick. So also the shuttle after it has been picked across the loom to either side must be stopped and positioned for the pick to the opposite side. Any suitable mechanical or electrical means may be provided for thus repositioning the translator and for checking and positioning the shuttle. Preferably electrical means are employed because thereby vibration, shock, and jar are minimized or practically eliminated. For example, by reversing the current supplied to the translator, or for that matter to the stator, coils and by cutting in resistance if required, the translator at the end of the picking movement may be returned to starting or picking position with the required acceleration and it may readily be timed and controlled in its return movement so as to check the shuttle in its flight from the opposite side of the loom. Preferably, however, the shuttle is independently checked and brought into picking position either by mechanical or electrically controlled means. In the construction illustrated, the shuttle is checked at the end of its flight and brought into picking position by the use of the principle of electro-magnetic induction such as described in our previous application.

The shuttle is received in and projected from a suitable shuttle box mounted at each end of the lay, as shown at 49 in Fig. 3 and 50 in Fig. 4. The shuttle in this case is made of or has embodied therein non-magnetic conductive material. For example, the shuttle itself may be constructed of aluminum. At the proper positions on the lay adjacent each shuttle box are mounted electro-magnets 51 and 52. Consequently by supplying direct current of the required power to these electro-magnets at and during the proper time and in the proper direction, current is induced in the conductive material of the shuttle and co-acting with the flux of the magnet brings the shuttle to rest without jar or vibration and locates it in the proper position.

This same principle of electro-magnetic induction may be employed in checking the movement of the translator itself and in this case simply by short-circuiting the conducting coils of the translator.

The proper sequence of any and all of these events, the power of the currents supplied to the stators, translators, and electro-magnets of the shuttle checking and positioning feature, the direction of movement of the translators may all readily be controlled in properly timed relation to the cycle of loom operation by any suitable means under the control of the loom or otherwise. In the construction illustrated a more or less diagrammatical form of control has been indicated in connection with Figs. 1 and 14. Therein a commutator cylinder 53 is mounted upon the main shaft 4 of the loom and provided with suitably positioned contact plates 54 adapted to cooperate with brushes 55, 56, 57, 58, 59, 60, 61, 62, 63, 64, 65 and 66 to secure the required sequence of events and control in accordance with the principles outlined. No provision has been illustrated for cutting in or out resistances which provide an obvious means for varying the power of electric currents employed.

Figure 6:
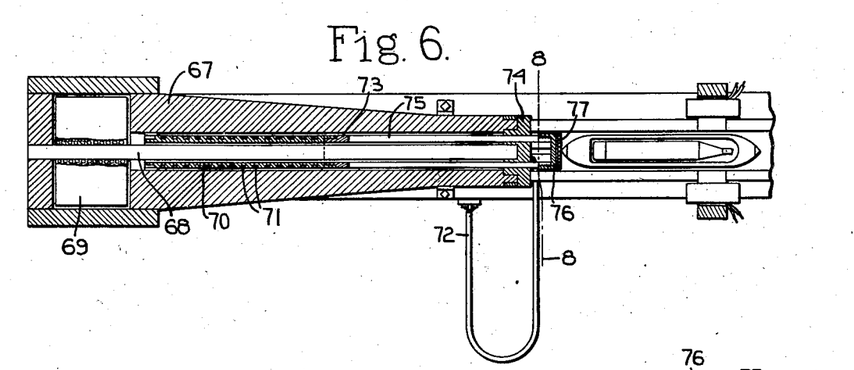
Fig. 6 is a view similar to Fig. 3 of another form of construction.
Figure 7:
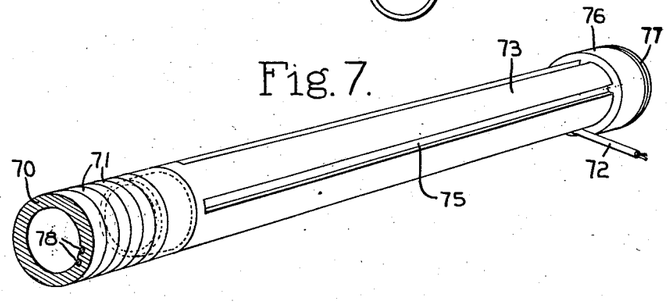
Fig. 7 is a view in perspective on a larger scale of the translator element shown in Fig. 6.
Figure 8:
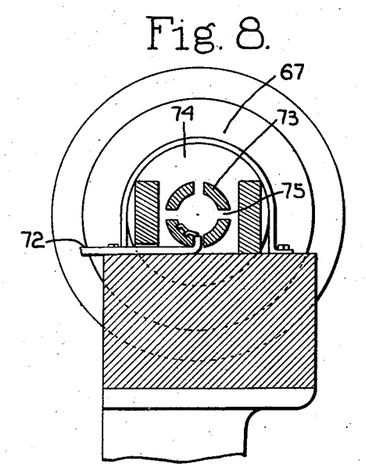
Fig. 8 is a view in vertical cross section taken on the line 8—8 of Fig. 6.
Figure 9:
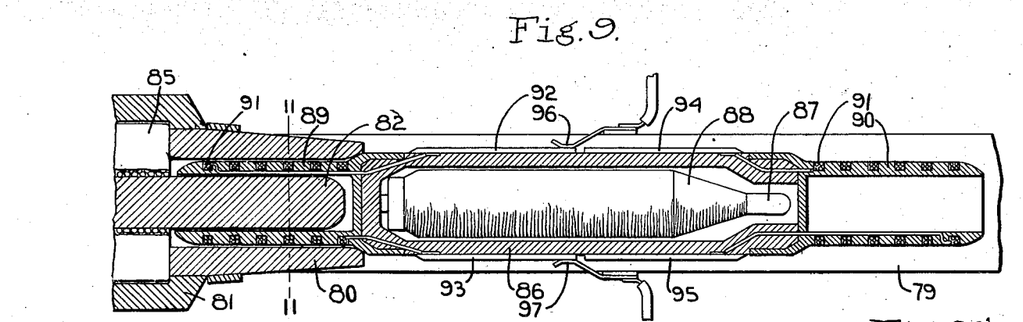
Figs. 9 and 9A are plan views, respectively, of the left-hand and right-hand ends of the lay chiefly in horizontal cross section of another form embodying the invention, the filling carrier or shuttle.
Figures 9A, 10, 11:
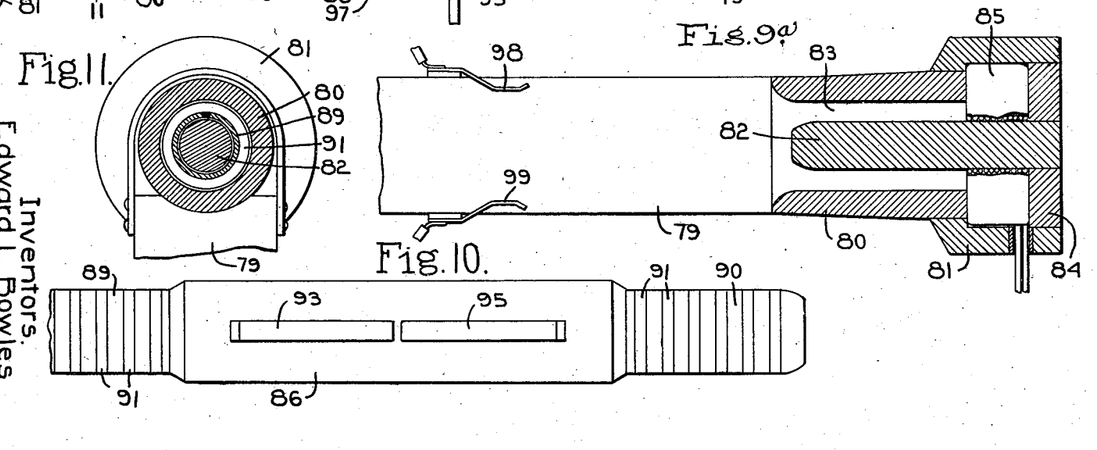
Fig. 10 is a side elevation of the shuttle construction shown in Fig. 9.
Fig. 11 is a view in cross section on the line 11—11 in Fig. 10.

Another form of mechanism embodying the same principles and varying chiefly in mechanical construction from that just described is illustrated in Figs. 6, 7 and 8. In this case the thrust is transmitted by the translator to the shuttle through a cylindrical extension of the translator rather than through the picker rod described. The construction of the stator with its outer hollow core 67, its inner cylindrical core 68, and its exciting coil 69 may be as before described. The main body 70 of the translator is also similarly constructed and provided with the conductor coils 71 having the leads extending at 72 to the lay. In this case, however, the body of the translator is extended at 73 and passes through the cap 74, being longitudinally slotted at 75 for that purpose. At its outer end it has suitably secured thereto a head 76 provided with a buffer 77 to engage the shuttle. The leads 72 extend along grooves 78 in the inner wall of the translator, and pass out at the extreme end near the head 76.

The broad principles of the invention are also applicable when the coaction of the stationary magnetic field and the conducted current is such as to cause the translator to be propelled completely away from the stator. In the case of a loom, this enables the filling carrier or shuttle to be made a part of the translator and to be carried thereby back and forth across the loom in the weaving operation. To effect this method of operation when, as illustrated, the translator carries the coils to which current is conducted, it is impractical to maintain continuous leads for the current to the translator and consequently brushes are employed for conducting the current to the translator while under the influence of the magnetic field.

A simple form of apparatus for illustrating this phase of the invention as embodied in the picking motion of a loom is shown in Figs. 9, 9A, 10 and 11. In this case the lay 79 of the loom is shown as provided at each end with a stator constructed in general and operating on the same principle as the stators hereinbefore specifically described. That is, at each end the stator comprises a core having an outer hollow cylindrical section 80, 81 and an inner concentric cylindrical section 82 with the cross section area of the part 80 properly proportioned throughout the length of the air gap 83. Magnetic material 84 provides a free path for the flux between the core sections and the flux is produced by the exciting coil 85.

The filling carrier is shown as a shuttle comprising a body portion 86 in which is mounted a bobbin 87 with its weft supply 88. The body 86 of the shuttle is extended at each end to provide hollow cylindrical translator sections 89 and 90. These are constructed on the same principle as heretofore described and preferably of radially laminated magnetic material such as soft iron. The shape and size is such that each translator section readily is guided into and slides in the air gap 83 of one of the stators. Each translator section is wound with the required conductors 91. The leads from the conductors 91 of the translator section 89 extend to contact plates 92 and 93 mounted on the left-hand half of the body of the shuttle, while the leads from the conductors 91 of the right-hand section of the translator extend to similar contact plates 94 and 95 on the right-hand body portion of the shuttle. The current is fed through brushes 96 and 97 mounted upon the left-hand end of the lay and through brushes 98 and 99 mounted on the right-hand end of the lay. These parts are so positioned that when the translator section 89 is within the field of the left-hand stator, the brushes 96 and 97 are in contact with the contact plates 92 and 93 and when the right-hand section of the translator is within the field of the stator at the right-hand end of the lay, the brushes 98 and 99 are in contact with the contact plates 94 and 95.

It will thus be seen that by controlling the time periods, direction and power of the current supplied to the stator coils and through the brushes to the translator sections in accordance with the principles hereinbefore set forth, the movement of the shuttle in proper timed relation back and forth across the lay is readily effected. Either translator section when within its cooperating stator is projected from the field of the stator rectilinearly thereof by the co-action of the stationary magnetic field of the stator and the conducted current transmitted to the coils of the translator, thus carrying the shuttle to the opposite side of the lay. When either translator section enters its cooperating stator, its conducting coils may be short-circuited, thus causing the translator, together with the shuttle, to be brought to rest at the end of its movement.

Figure 12:
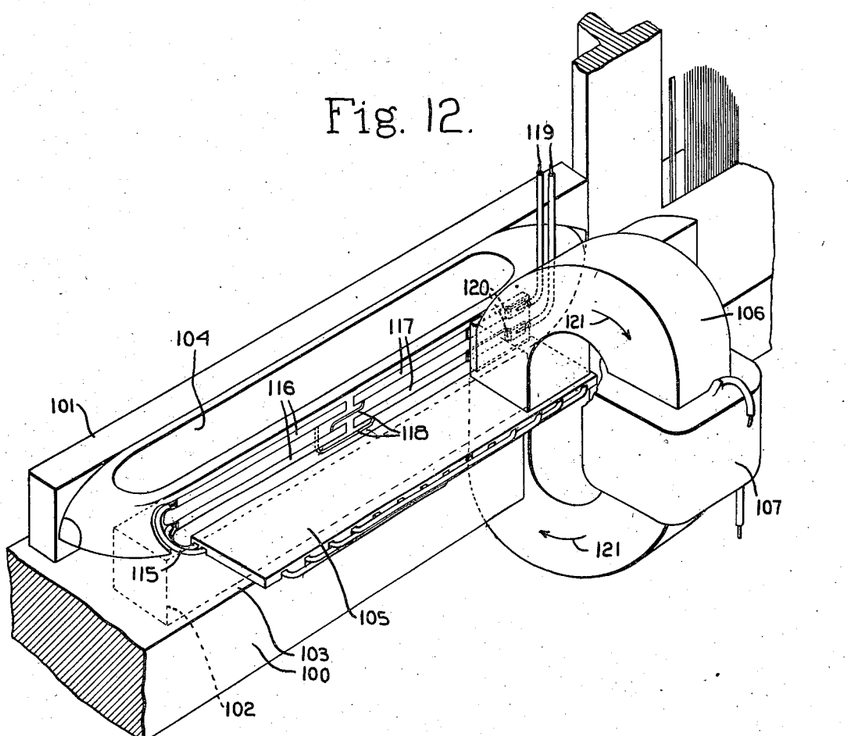
Fig. 12 is a perspective view showing the left-hand end of the lay of the loom, together with another form of construction embodying the invention.
Figure 13:
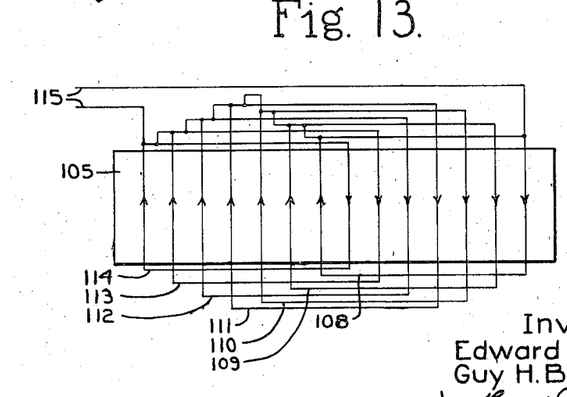
Fig. 13 is a wiring diagram for the construction shown in Fig. 12.
Figure 14:
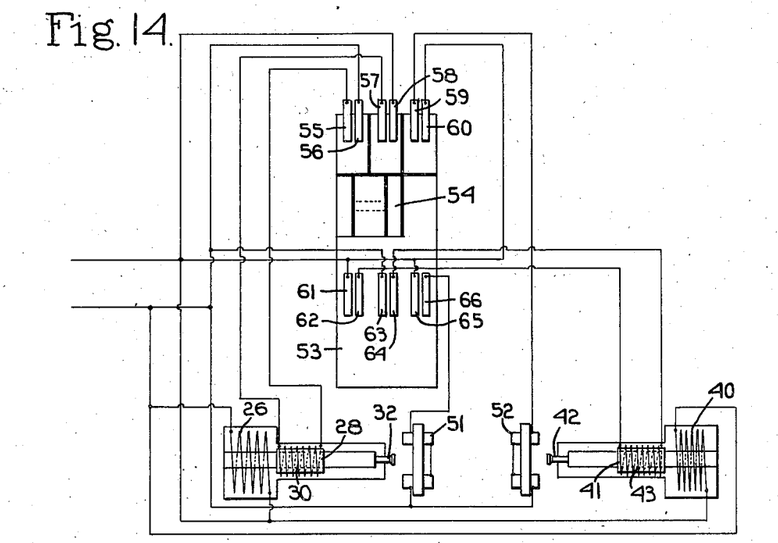
Fig. 14 is a wiring diagram for the construction shown in Figs. 1–5.
Figure 15:
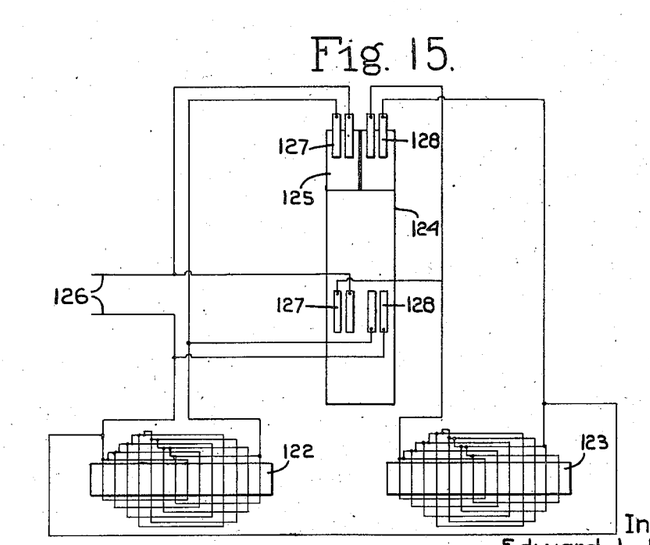
Fig. 15 is a wiring diagram for a loom embodying the construction such as shown in Fig. 12.

Another form in which the invention may be embodied as applicable to the picking motion of a loom and as exemplifying the movement of the translator entirely out of and into the stator field is shown in Figs. 12, 13, and 15 of the drawings. As the construction is the same at both ends of the lay of the loom, it is sufficient to illustrate that at the left-hand end. The lay 100 carries at the end the shuttle box comprising the rear wall 101 and the front wall 102 separated at its inner portion at the bottom from the raceway by the narrow space 103. The shuttle is of the general type described in our aforesaid application, that is, it comprises the body portion 104 carrying the weft supply, not shown, in the usual manner, and is provided with the laterally projecting fin 105 adapted to slide within the space 103. The body of this fin may be constructed as hereinbefore described, but is preferably of non-magnetic material to avoid any unbalanced, and consequently binding, action in its passage through the stator.

The stator is shown as comprising a large core 106, preferably of laminated magnetic material such as soft iron, and shaped substantially as shown so as to present between its opposed ends a narrow air gap of a width slightly greater than the thickness of the fin 105. The magnetic field is secured by the exciting coil 107 surrounding the outer portion of the core 106. The conductor coils to which current is conducted to the translator are shown as flat overlapping coils embedded in grooves formed in the fin so that these coils lie in the plane of the fin 105 with runs extending transversely across the fin. These coils are symmetrically arranged so that the action may be the same at both ends of the lay and in co-action with either stator. As a specific illustration, seven coils 108, 109, 110, 111, 112, 113 and 114 are shown with runs on which are placed arrow heads in Fig. 13 extending transversely at right angles across the fin 105. These coils are connected by current leads 115 to contact plates 116 extending along the left-hand outer wall of the shuttle to a point midway the length of the fin. Contact plates 117 extend from this point along the right-hand end of the shuttle wall and the contact plates 116 and 117 are reversely connected by leads 118. The current is conducted through leads 119 to brushes 120 mounted on the interior of the shuttle box wall 102 opposite the center of the core 106 of the stator and in position to engage the contact plates on the shuttle.

The operation of this mechanism will now be apparent. With the shuttle in position in the left-hand box, as shown, for example, in Fig. 12, and with the brushes 120 engaging the contact plates 117 to cause the current to flow in the coils 108 to 114 in the direction indicated by the arrow heads in Fig. 13 and with the flux in the stator flowing in the paths indicated by the arrows 121, it will be seen that the co-action between the magnetic field of the stator and the current conducted to the coils of the translator will be such as to accelerate the motion of the shuttle toward the right-hand side of the loom. As the middle of the fin reaches the middle of the stator, the connections 118 act to reverse the current in the translator as the brushes pass on to the contact plates 116 so that the direction of the current in the transverse runs of the coils in the fin is maintained in the same direction as the fin passes through the stator. Owing to the width of the core 106, while there will be a slight interference as the middle point of the fin passes through the stator core, the momentum of the shuttle is such as to render this inconsequential.

The movement of the translator carrying the shuttle is under complete control through the control of the time periods, the direction of the current and the power of the current supplied to the stator coils and to the translator coils, and the translator may be checked by short-circuiting the translator coils all in accordance with the principles hereinbefore set forth. Such control may, as hereinbefore disclosed, be in the form of a commutator driven by a shaft of the loom and one form of such control is diagrammatically indicated in Fig. 15 where are indicated the extreme positions of the translator at 122 and 123, the commutator cylinder at 124 provided with a suitably spaced and size contact plates such as 125, the leads 126 to a direct current supply, the brushes 127 for supplying the current to the translator coils as required, and the brushes 128 for short-circuiting these coils when required.

Having thus described the invention, what is claimed as new, and desired to be secured by Letters Patent, is:

1. An electro-dynamic apparatus for controlling the movement of a body in a rectilinear path comprising a stator having a rectilinear core, an exciting coil upon the core, a translator movable longitudinally of said stator core, coils upon said translator, a source of direct current connected to the coils of said stator and translator with the flux in the stator core coacting at all times with the current flowing in all the coils of the translator to produce movement of the translator, and means for controlling the current supplied to one of said stator and translator elements to control the coaction of the flux of the stator and the current in the translator coils and thereby the direction of movement of the translator relatively to the stator.

2. An electro-dynamic apparatus for controlling the movement of a body in a rectilinear path comprising a stator having a core, an exciting coil upon the core, a translator movable longitudinally of said stator core, coils upon said translator, a source of direct current connected to the coils of said stator and translator to produce fluxes of substantially constant intensity in, and stationary relatively to, each, which fluxes coact to produce movement of the translator, and means for controlling the current supplied to one of said stator and translator elements to control the coaction of the fluxes of the said elements to initiate and accelerate the movement of the translator in one direction relatively to the stator, to decelerate it at the end of its said movement and to accelerate it in the opposite direction after it has come to rest.

3. An electro-dynamic apparatus for controlling the movement of a body in a rectilinear path comprising a stator having a core, an exciting coil upon the core, a translator movable longitudinally of said stator core, coils upon said translator, a source of direct current connected to the coils of said stator and translator to produce fluxes of substantially constant intensity in, and stationary relatively to, each, which fluxes coact to produce movement of the translator, and means for controlling the current supplied to one of said stator and translator elements to control the coaction of the fluxes of the said elements to initiate and accelerate the movement of the translator in one direction relatively to the stator, to decelerate it at the end of its said movement and to accelerate it in the opposite direction after it has come to rest, and a non-magnetic extension on the translator projecting beyond the limits of the stator for transmitting movement of the translator.

4. An electro-dynamic apparatus for controlling the movement of a body in a rectilinear path comprising a stator having a core, an exciting coil upon the core, a translator movable longitudinally of said stator core, coils upon said translator, a source of direct current connected to the coils of said stator and translator to produce fluxes of substantially constant intensity in, and stationary relatively to, each, which fluxes coact to produce movement of the translator, and means for controlling the current supplied to said stator and translator elements to control the coaction of the fluxes of the said elements to cause the translator to be projected from the field of the stator without reduction of the speed attained by it.

5. An electro-dynamic apparatus for initiating and accelerating the motion of a body in a rectilinear path comprising a stator having a core of rectilinear form comprising an outer hollow cylindrical section and an inner cylindrical section extending throughout the length thereof and presenting between said core sections an annular air gap extending throughout the length of the core, magnetic material closing said air gap at one end of said core, a hollow cylindrical translator movable rectilinearly within said air gap, and means for producing fluxes in the stator and translator which coact to initiate and accelerate the movement of the translator within the core.

6. An electro-dynamic apparatus for initiating and accelerating the motion of a body in a rectilinear path comprising a stator having a core of rectilinear form comprising an outer hollow cylindrical section and an inner cylindrical section extending throughout the length thereof and presenting between said core sections an annular air gap extending throughout the length of the core, magnetic material closing said air gap at one end of said core, a hollow cylindrical translator movable rectilinearly within said air gap, and means for producing fluxes in the stator and translator which coact to initiate and accelerate the movement of the translator within the core and cause the translator to be projected from the core.

7. An electro-dynamic apparatus for initiating and accelerating the motion of a body in a rectilinear path comprising a stator having a core of rectilinear form comprising an outer hollow cylindrical section and an inner cylindrical section extending throughout the length thereof and presenting between said core sections an annular air gap extending throughout the length of the core, magnetic material closing said air gap at one end of said core, means to produce a stationary flux of substantially constant intensity within the core which traverses the outer section longitudinally, crosses the air gap, returns through the inner core section and completes its path through the said magnetic material, a hollow cylindrical electro-magnetic translator movable rectilinearly within said air gap, and means upon said translator to produce a flux which coacts with the flux of said stator to initiate and accelerate the movement of the translator within the core.

8. An electro-dynamic apparatus for initiating and accelerating the motion of a body in a rectilinear path comprising a stator having a core of rectilinear form comprising an outer hollow cylindrical section and an inner cylindrical section extending throughout the length thereof and presenting between said core sections an annular air gap extending throughout the length of the core, magnetic material closing said air gap at one end of said core, means to produce a stationary flux of substantially constant intensity within the core which traverses the outer section longitudinally, crosses the air gap, returns through the inner core section and completes its path through the said magnetic material, a hollow cylindrical electro-magnetic translator movable rectilinearly within said air gap, and means upon said translator to produce a flux which coacts with the flux of said stator to initiate and accelerate the movement of the translator within the core and to cause the translator to be projected from the core without reduction of the speed attained by it.

9. An electro-dynamic apparatus for initiating and accelerating the motion of a body in a rectilinear path comprising a stator and a translator, said stator having a core of rectilinear form comprising an outer hollow cylindrical section and an inner cylindrical section extending throughout the length thereof and presenting between said core sections an annular air gap in which the translator is received and is movable in a rectilinear path, an exciting coil on the core, magnetic material closing said annular air gap at one end of said core, exciting coils embedded in the translator, a source of direct current connected to the coil on the stator to produce a flux the paths of which extend longitudinally of the outer core section, across the translator, longitudinally of the inner core section and complete their circuit through the said magnetic material, and a source of direct current connected to the coils upon the translator acting to produce a flux therein which coacts with the flux of the stator to initiate and accelerate the motion of the translator longitudinally of the core.

10. An electro-dynamic apparatus as defined in claim 9, together with means to disconnect the direct current from the translator coils and to short-circuit the said coils, thereby to decelerate the movement of the translator by inducing within the coils thereof a current which coacts with the flux of the stator to effect such deceleration.

11. An electro-dynamic apparatus for initiating and accelerating the motion of a body in a rectilinear path comprising a stator and a translator, said stator having a core of rectilinear form comprising an outer hollow cylindrical section and an inner cylindrical section extending throughout the length thereof and presenting between said core sections an annular air gap in which the translator is received and is movable in a rectilinear path, an exciting coil on the core, magnetic material closing said annular air gap at one end of said core, exciting coils embedded in the translator, a source of direct current connected to the coil on the stator to produce a flux the paths of which extend longitudinally of the outer core section, across the translator, longitudinally of the inner core section and complete their circuit through the said magnetic material, a source of direct current connected to the coils upon the translator acting to produce a flux therein which coacts with the flux of the stator to initiate and accelerate the motion of the translator longitudinally of the core and to cause the translator to be projected from the core, and means acting when the translator is moved into the core to disconnect the direct current from the translator coils and to short-circuit the said coils, thereby to decelerate the movement of the translator by inducing within the coils thereof a current which coacts with the flux of the stator to effect such deceleration.

12. An electro-dynamic apparatus for initiating and accelerating the motion of a body in a rectilinear path comprising a stator having a core of rectilinear form, means for energizing said stator to produce relatively thereto a stationary magnetic field of constant mean intensity, a translator movable in a rectilinear path longitudinally of said core and provided with conducting coils, means to conduct electric current to said coils to produce relatively to said translator a stationary field of constant mean intensity, and in which entire convolutions of the translator coils move through the stator field with the current in each portion of each convolution flowing at substantially right angles to the flux paths of the stator field, thereby to cause the coaction of the stator and translator fields to propel the translator continuously in the same direction.

13. An electro-dynamic apparatus for initiating and accelerating the motion of a body in a rectilinear path comprising a stator having a core of rectilinear form, means for energizing said stator to produce relatively thereto a stationary magnetic field of constant mean intensity, a translator movable in a rectilinear path longitudinally of said core and provided with conducting coils, means to conduct electric current to said coils to produce relatively to said translator a stationary field of constant mean intensity, and in which entire convolutions of the translator coils move through the stator field with the current in each portion of a convolution which moves across and substantially at right angles to the flux paths of the stator field and to the direction of translator motion, having the same direction of flow thereby to cause the coaction of the stator and translator fields to propel the translator continuously in the same direction.

14. An electro-dynamic apparatus for initiating and accelerating the motion of a body in a rectilinear path comprising a stator having a core of rectilinear form, means for energizing said stator to produce relatively thereto a stationary magnetic field of constant mean intensity, a translator movable in a rectilinear path longitudinally of said core and provided with conductors extending substantially at right angles to the flux paths of the stator field and to the direction of translator motion; means for conducting electric current to said conductors to produce relatively to the translator a stationary field of constant mean intensity and in which all of the said conductors move through the flux paths of the stator field with the conducted current flowing therein in the same direction relatively to the flux paths of the stator field thereby to cause the co-action of the conducted current and the stator field to propel the translator continuously in the same direction.

15. An electro-dynamic apparatus for effecting rectilinear movement comprising an electromagnetic system having a rectilinear core, the said core having an outer hollow cylindrical section, an inner concentric cylindrical section separated from the outer section by an annular air gap, a magnetic connection between one end of the core sections, a non-magnetic connection between the other end and an exciting coil on said core acting to produce a stationary flux of substantially constant mean intensity distributed across the annular air gap longitudinally of the core, and a cylindrical translator mounted and movable within the air gap having electric conductors extending circumferentially thereof to which direct electric current is conducted and in which the flux produced by said conductors co-acts with the flux in said core to effect the rectilinear movement of the translator within the air gap.

16. An electro-dynamic apparatus for effecting rectilinear movement comprising an electromagnetic system having a rectilinear core, the said core having an outer hollow cylindrical section, an inner concentric cylindrical section separated from the outer section by an annular air gap, a magnetic connection between one end of the core sections, and an exciting coil on said core acting to produce a stationary flux of substantially constant mean intensity distributed across the annular air gap longitudinally of the core, and a cylindrical translator movable within and without of the air gap having electric conductors extending circumferentially thereof to which direct electric current is conducted and in which the flux produced by said conductors co-acts with the flux in said core to effect the rectilinear movement of the translator within the air gap and to cause the translator to be projected from the core without reduction of the speed attained by it.

17. A loom having at each side thereof an electro-dynamic apparatus for initiating and accelerating the movement of a filling carrier across the loom comprising a stator having a rectilinear core extending transversely of the loom, means for energizing each stator to produce relatively thereto a stationary magnetic field of constant mean intensity, a filling carrier propelling translator co-acting with and movable longitudinally of each core, and means to energize each translator to produce relatively thereto a stationary field of constant mean intensity, whereby when the apparatus at either side of the loom is thus energized, the translator will be initiated and accelerated by the co-action of the fields in a direction toward the center of the loom to propel the filling carrier across the loom.

18. A loom having at each side thereof an electro-dynamic apparatus for initiating and accelerating the movement of a filling carrier across the loom comprising a stator having a rectilinear core extending transversely of the loom, means for energizing each stator to produce relatively thereto a stationary magnetic field of constant mean intensity, a filling carrier propelling translator for each stator movable in a rectilinear path longitudinally of the core and provided with conducting coils, means to conduct electric current to said coils to produce relatively to each translator a stationary field of constant mean intensity, and in which entire convolutions of the translator coils move through the corresponding stator field with the current in each portion of each convolution flowing at substantially right angles to the flux paths of the stator field and to the direction of translator movement, thereby to cause the coaction of the stator and translator fields at each side of the loom to propel the translator continuously in the same direction as it acts to propel the filling carrier across the loom.

19. A loom having at each side thereof an electro-dynamic apparatus for initiating and accelerating the movement of a filling carrier across the loom comprising a stator and a filling carrier propelling translator, each of said stators having a rectilinear core extending transversely of the loom comprising an outer hollow cylindrical section and an inner cylindrical section extending throughout the length thereof and presenting between said core sections an annular air gap in which the corresponding translator is received and is movable in a rectilinear path, exciting coils on each core, magnetic material closing the annular air gaps at the outer ends of said cores, exciting coils embedded in each translator, a source of direct current connected to coils on the stators to produce flux the paths of which extend longitudinally of the outer core sections, across the translator, longitudinally of the inner core sections and complete their circuit through the said magnetic material, and a source of direct current connected to the coils upon each translator acting to produce a flux therein which coacts with the flux of the corresponding stator to initiate and accelerate the motion of the translator longitudinally of the core thereby to propel the filling carrier across the loom.

20. A loom having the construction defined in claim 19, together with means to disconnect the direct current from the coils to each translator and to short-circuit the said coils when the filling carrier approaches the corresponding side of the loom thereby to decelerate the movement of the translator and check the movement of the filling carrier by inducing within the coils of the translator a current which co-acts with the flux of the stator to effect such deceleration.

21. A loom having at each side an electro-dynamic apparatus for initiating and accelerating the movement of a filling carrier across the loom comprising a stator having a rectilinear core extending transversely of the loom with each stator comprising an outer hollow cylindrical section and an inner cylindrical section extending throughout the length thereof and presenting between said core sections an annular air gap, magnetic material closing said air gaps at one end of each core, means to produce a stationary flux of substantially constant intensity within each core which travels the outer section longitudinally, crosses the air gap, returns through the inner core section and completes its path through the said magnetic material, a hollow cylindrical electro-magnetic filling carrier propelling translator associated with and movable rectilinearly within each air gap, and means upon each translator to produce a flux which coacts with the flux of its associated stator to initiate and accelerate the movement of the translator within the core, thereby to propel the filling carrier across the loom.

22. A loom having the construction defined in claim 21 in which the propelling translators are connected respectively to the ends of the filling carrier so that the three elements move together and each translator cooperates alternately with each stator.

23. A loom having at each side an electro-dynamic apparatus for initiating and accelerating the movement of a filling carrier across the loom comprising a stator having a rectilinear core extending transversely of the loom and in which each core comprises an outer hollow cylindrical section and an inner cylindrical section extending throughout the length thereof and presenting between said core sections an annular air gap, magnetic material closing the air gap at the outer end of each core, a filling carrier propelling hollow cylindrical translator coacting with and movable rectilinearly within the air gap of each core, and means for producing fluxes in each stator and coacting translator which coact to initiate and accelerate the movement of each translator within its core thereby to propel the filling carrier across the loom.

24. A loom having at each side an electro-dynamic apparatus for controlling the movement of a filling carrier comprising a stator having a rectilinear core extending transversely of the loom, exciting coils on the cores, filling carrier propelling translators coacting respectively with and movable longitudinally of said cores, coils upon said translators, a source of direct current connected to the coils of the stators and translators to produce fluxes of substantially constant intensity in and stationary relatively to each, which fluxes coact to produce movement of the translators, means for changing the direction of the current supplied to one of said stator and translator elements to change the polarity of the flux therein which coacts with the flux of the other element thereby to control the direction of movement of each translator relatively to its stator and thereby the movement of the filling carrier.

25. A loom having at each side an electro-dynamic apparatus for controlling the movement of a filling carrier comprising a stator having a rectilinear core extending transversely of the loom, exciting coils on the cores, filling carrier propelling translators coacting respectively with and movable longitudinally of said cores, coils upon said translators, a source of direct current connected to the coils of the stators and translators to produce fluxes of substantially constant intensity in and stationary relatively to each, which fluxes coact to produce movement of the translators, and means for controlling the current supplied to one of each stator and translator elements to control the coaction of the fluxes of the said elements, to initiate and accelerate the movement of each translator in one direction relatively to its stator, to decelerate it at the end of its said movement, and to accelerate it in the opposite direction after it has come to rest, and a non-magnetic extension on each translator projecting beyond the limits of its stator for propelling the filling carrier when independent of the translator.

26. A loom having at each side an electro-dynamic apparatus for controlling the movement of a filling carrier comprising a stator having a rectilinear core extending transversely of the loom, exciting coils on the cores, filling carrier propelling translators coacting respectively with and movable longitudinally of said cores, coils upon said translators, a source of direct current connected to the coils of the stators and translators to produce fluxes of substantially constant intensity in, and stationary relatively to, each, which fluxes coact to produce movement of the translators, and means for controlling the current supplied to one of each stator and translator elements to control the coaction of the fluxes of the said elements, to initiate and accelerate the movement of each translator in one direction relatively to its stator, to decelerate it at the end of its said movement, and to accelerate it in the opposite direction after it has come to rest, whereby the filling carrier is propelled back and forth across the loom as required.

27. A loom having the construction defined in claim 26, in which the translators are connected respectively to the opposite ends of the filling carrier and move therewith.

28. A loom having mounted thereon at the side of the shed and electro-dynamic apparatus comprising a core having concentric rectilinear cylindrical sections extending transversely of the loom and separated by an annular air gap, an exciting coil on said core producing when connected with a direct electric current a stationary magnetic field of substantially constant density distributed longitudinally of the core and across the air gap, and a cooperating filling carrier propelling cylindrical translator fitting and movable within the air gap and provided with electric conductors to which direct electric current is conducted, the said conductors producing a flux coacting with that of the said magnetic field to initiate and accelerate the movement of the translator longitudinally of the core and thus effect the projection of the filling carrier across the loom.

29. A loom having the construction defined in claim 28, in which the filling carrier and translator are connected and move together.

30. A loom provided with electro-dynamic means energized by direct electric current and with a filling carrier having conductors to which direct electric current is conducted, with the fluxes produced in the said elements co-acting to initiate and accelerate the movement of the filling carrier and project it out of the field of the said electro-dynamic means across the loom.

31. A loom provided with an electro-magnetic stator energized by a direct electric current and with a filling carrier propelling translator carrying conductors to which direct electric current is conducted and in which the fluxes produced in said stator and translator coact to effect acceleration of the translator transversely of the loom and thereby the propulsion of the filling carrier across the loom.

32. A loom provided with electro-dynamic means comprising an electro-magnetic system having a rectilinear core extending in a direction transversely of the loom and energized by an electric current to produce a stationary flux of substantially constant mean intensity distributed longitudinally of the core, a filling carrier, a translator for propelling the filling carrier provided with electric conductors extending transversely of the core, means for conducting direct electric current to said conductors to produce a flux coacting with the aforesaid flux to effect acceleration of the translator transversely of the loom and thereby the propulsion of the filling carrier across the loom.

EDWARD L. BOWLES.
GUY HOWARD BERARD SMITH, JR.